Dec. 17, 1968 L. PENROD 3,416,686
HAYSTACKER
Filed Dec. 2, 1966 2 Sheets-Sheet 1
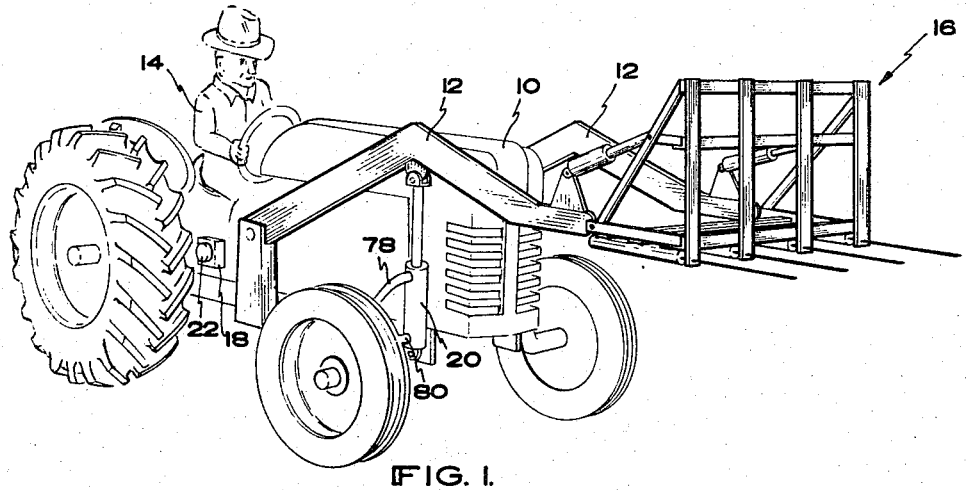
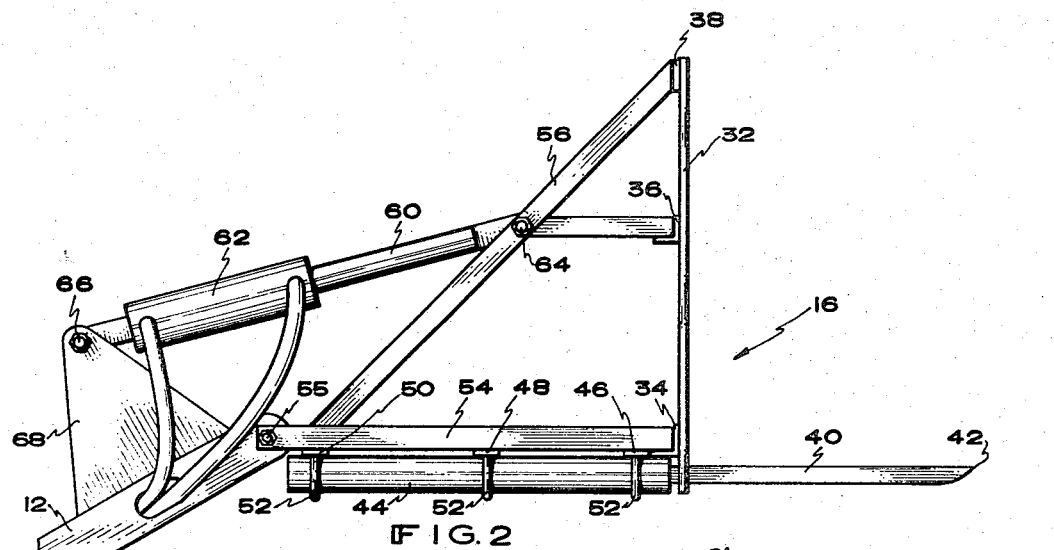
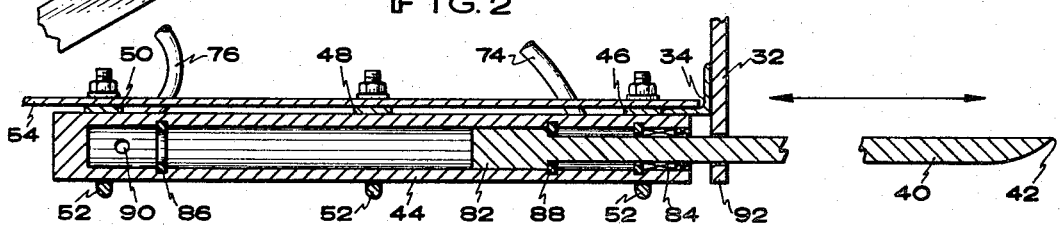
INVENTOR.
LLOYD PENROD
BY C. Harvey Gold
HIS ATTORNEY

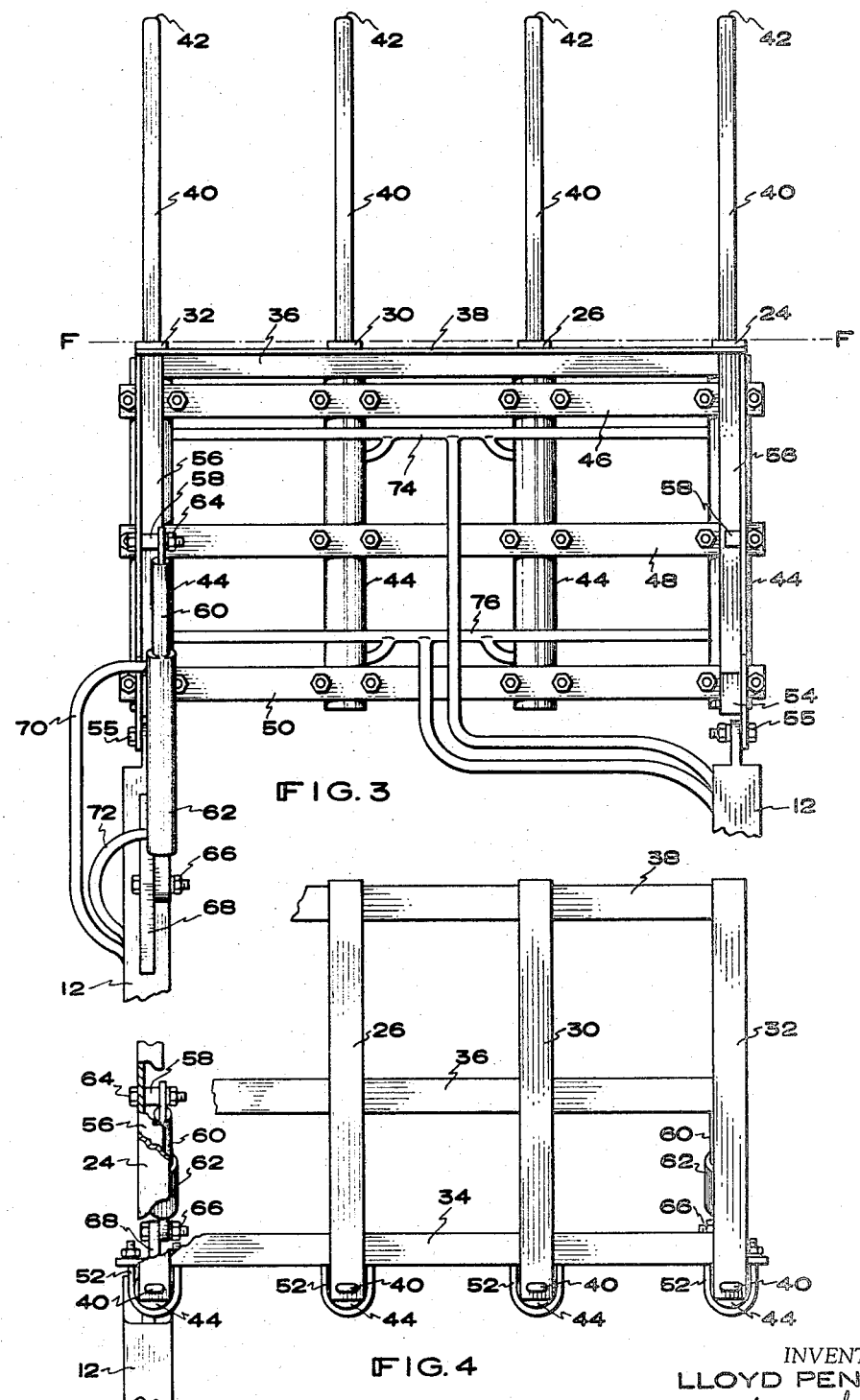

United States Patent Office 3,416,686
Patented Dec. 17, 1968

3,416,686
HAYSTACKER
Lloyd Penrod, Box 5, Goshen, Utah 84633
Filed Dec. 2, 1966, Ser. No. 598,869
10 Claims. (Cl. 214—778)

ABSTRACT OF THE DISCLOSURE

A baled haystacker, to be used with a vehicle having load elevation equipment, which comprises a bale aligning face connected to the load elevating equipment and bale support fingers attached to the aligning face proximate its bottom edge and positioned substantially perpendicular to said aligning face. The support fingers are adapted to move outwardly away from the aligning face and inwardly to a position behind said face. The aligning face can be pivotally connected to the load elevating equipment for adjusting the position of support fingers when the haystacker is raised and lowered.

---

This invention relates to a haystacker, and in particular, to a haystacker which is adapted to be used in combination with a traction vehicle such as a tractor.

It is common practice to bale hay after the standing hay is cut, furrowed, and cured. Machinery is conventionally used for this purpose which generally produces rectangular bales. After the bales are formed they are merely dropped to the ground and are subsequently picked up and placed in layers to produce a self-sustaining stack. Heretofore a pickup machine in conjunction with a wagon and hand labor has been required to pick up the bales in the field and transport them to a location where the stack is to be formed. At this point in the stacking operation additional machinery and considerable hand labor has been required for unloading the wagon and placing the bales in proper stacking relationship with each other. Even with the use of unloading machines of the type heretofore used, baled hay stacking has been a relatively slow process and the finished stack often exhibited excessive wide spaces or seams between the bales which weakened the stack and permitted the elements to easily enter therebetween resulting in substantial damage to the stacked bales. Attempts have been made to overcome these problems by using self-propelled loading devices adapted to pick bales off of the ground and place them on a pickup wagon and then remove the bales from the wagon and properly stack them. However, these operations are generally not compatible ones since pickup machines reqiure a support upon which the bales are stacked. The support generally prevents bales placed thereon from being positioned on a stack in a predetermined location since it must be withdrawn while still supoprting said bales. Attempts have been made to overcome this problem by providing means in combination with the support for urging the bales stacked on said support onto the haystack. However, devices of this type are difficult to operate and, in addition, often exert a susbtantial force against the stack which force often upsets the stack thereby rendering the individual bales more difficult to pick up either by hand or with loading apparatus, and also often renders the hay unsuitable for use due to excessive exposure.

Accordingly, it is an object of my invention to provide a hayloader which overcomes the objections and disadvantages heretofore found in such devices.

It is still another object of my invention to provide a baled haystacker which may be used as a pickup machine as well as a stacking machine.

Still another object of my invention is to provide a baled haystacker adapted for use with a self-propelled truck or tractor of the type having load elevating apparatus.

Still another object of my invention is to provide a baled haystacker which enables bales to be loaded onto a stack without danger of pushing the stack over due to the reaction of a bale pushover mechanism or pulling the stack over due to the friction of withdrawing the bale support from between the stacked bales.

Still another object of my invention is to provide a device for unloading stacked bales from a previously formed bale stack without tipping said stack due to the force required to insert bale supporting means between stacked bales.

Still another object of my invention is to provide a stacking device which permits flat engagement with the top layer of a bale stack so as to prevent uneven contact with the top layer of the stack.

Still another object of my invention is to provide a baled haystacker with bale supporting fingers which are adapted to be urged under bales positioned on the ground or between bales in a stack without moving the traction vehicle to which said stacker is attached and to further remove said fingers from under bales supported thereon without causing said supported bales to be shifted.

Still another object of my invention is to provide a haystacker which is inexpensive to construct, simple in design, and easy to operate.

Still further objects of my invention will become apparent to those skilled in the art as the invention is better understood by reference to the detailed description appearing hereinafter.

According to my invention the foregoing objects and attendant advantages are obtained by providing a haystacking device in combination with a traction vehicle equipped with load elevating equipment. The stacking device is provided with an aligning member having a front aligning face for orienting the position of bales supported by said stacking device. The aligning member is pivotally mounted to said elevating equipment wherein said member may be maintained in any predetermined plane while said stacking device is elevated and lowered. Supporting fingers are provided in coacting relationship with the bottom of said aligning member and extend outwardly therefrom in a plane which is substantially perpendicular with said aligning member. The support fingers are adapted to slide inwardly towards the front aligning face of said aligning member and also outwardly away from said face. When said fingers are in their outwardly extended position they are arranged to support bales of hay which are stacked thereon and when said supports are retracted they are moved away from under said bales thereby releasing them. The bales supported by said fingers are positioned in coacting relationship with the front aligning face of said aligning member. Accordingly, when the support fingers are retracted bales stacked thereon are maintained in a predetermined position and are not allowed to shift because of their coaction with said aligning member. In the preferred embodiment of my invention said support fingers are provided with a sharpened end which is adapted to be easily urged inwardly between stacked bales.

So that the invention may be more readily understood and carried into effect, reference is made to the accompanying drawings which are offered by way of example only and are not to be taken as limiting the invention, the scope of which is defined by the appended claims, which obviously embrace equivalent structures and processes.

FIGURE 1 is a perspective view of the haystacker of my invention in combination with a conventional tractor equipped with load elevating means.

FIGURE 2 is a side view of the haystacker of my invention showing the aligning member and its relative position to my retractable support means, in their extended position, for supporting hay bales positioned thereon.

FIGURE 3 is a top view of the haystacker of my invention showing in detail the hydraulically activated support fingers and their relationship to the aligning member. Also shown in the figure is the coaction between my haystacker and the equipment elevating means used in combination with a conventional traction vehicle.

FIGURE 4 is a front view of the haystacking device of my invention showing the preferred construction of my bale aligning member.

FIGURE 5 is a sectional view of one type of hydraulically activated supporting finger means used in my haystacking device showing in detail the preferred finger and its coaction with the aligning member.

Referring now more particularly to the drawings, FIGURE 1 shows a conventional traction vehicle 10, e.g., tractor, pickup truck, Jeep, etc., hereinafter referred to as tractor 10, equipped with load elevating means of a conventional and well known type provided with support arms 12 mounted on opposite sides of tractor 10 so as to allow tractor operator 14 to raise and lower equipment connected to the ends of arms 12 such as haystacker 16 of my invention. Said load elevating means is preferably hydraulically driven with hydraulic fluid maintained in reservoir 18 and pumped to hydraulic cylinder 20 with pump 22. Support arms 12 are preferably shaped so as to enable stacker 16 to be lowered to ground level and also allow said stacker 16 to be elevated to a position substantially above tractor 10.

Haystacker 16 is shown in detail in FIGURES 2 through 4. Said stacker comprises a plurality of rigid aligning strips 24, 26, 30 and 32 which are maintained in a substantially flat plane with positioning members 34, 36 and 38. By using a construction of this type a hatched aligning plate or frame is formed which is used to maintain bales in a position aligned with front face F—F of said aligning strips. It is to be noted that while I prefer to use a construction of the type described since it enables operator 14 to see through the aligning strips, it is also within the scope of my invention to use a solid substantially flat plate for this purpose. Positioning members 34, 36 and 38 are preferably formed from conventional angle iron which imparts substantial strength to them and, in addition, facilitates their being connected to loader support members as hereinafter described.

Support fingers 40 are positioned in coacting relationship with aligning strips 24, 26, 30 and 32 proximate their bottom end and in a plane which is substantially perpendicular with plane F—F formed by the face of said aligning strips. It is to be noted, however, that fingers 40 may be placed at an angle of about 80 to 100 degrees with said plane F—F. Said support fingers 40 are adapted to be retracted so that their outwardmost end 42 is positioned behind front faces F—F of aligning strips 24, 26, 30 and 32 when said fingers are in their retracted position. Accordingly, when support fingers 40 are retracted said aligning strips may freely abut against a bale of hay. When aligning strips 24, 26, 30 and 32 are positioned in this fashion, support fingers 40 may then be urged under said bale in a fashion hereinafter described. Support fingers 40 are preferably activated by hydraulic cylinders 44 which are securely attached to bottom plates 46, 48 and 50 with conventional U-bolts 52. Said cylinders 44 are double acting ones thereby enabling support fingers 40 to be forced under pressure in an outward as well as an inward direction.

As previously indicated, cylinders 44 are securely attached to bottom supports 46, 48 and 50. Said bottom supports are in turn connected to loader support members 54 which are attached at one of their ends to positioning member 34 and at their opposite end to the bottom end of diagonal brackets 56 and 58. Diagonal brackets 56 and 58 are in turn secured at their top end to positioning member 38 to thereby form a triangular loader construction which provides a support structure which is completely rigid. Preferably, supports 54 and diagonal supports 56 and 58 are of conventional angle iron construction thereby imparting substantial strength to said supports.

As shown in FIGURE 2, loader 16 is pivotly connected to the ends of lift arms 12 which arms are in turn secured to tractor 10 so as to enable them to be raised and lowered in a conventional fashion. Preferably, said arms 12 are secured to loader 16 by pivotly connecting them to the ends of loader support members 54 with pins 55. Rotational movement of loader 16 on lift arms 12 is controlled with double acting hydraulic piston rods 60 which rods are housed in hydraulic cylinders 62. One end of said piston 60 is pivotly connected with pin 64 to diagonal support 56, with spacer 58 being used to properly align said piston rod 60. The opposite end of said piston rod 60 is, as indicated, secured within cylinder 62 and said cylinder is pivotly secured with pin 66 to vertically extending mounting bracket 68 which bracket is fixedly attached to lift arm 12. While only one cylinder with coacting piston rod is required to properly position loader 16, I prefer to use a plurality of such means, i.e., a cylinder and coacting piston rod connected to each lift arm 12 as shown in FIGURE 4.

As previously indicated, cylinders 20, 44 and 62 are hydraulically activated. Hydraulic fluid reservoir 18 and hydraulic pump 22 may be used for this purpose in a well known fashion. As indicated, said cylinders are double acting ones, i.e., they act under force in moving their associated piston in both an inward and an outward direction. To accomplish this, hydraulic lines are connected to the opposite ends of said cylinders, i.e., line 70 is connected to one end of cylinder 62 and line 72 is connected to said cylinder's opposite end; line 74 is connected to one end of cylinder 44 and line 76 is connected to said cylinder's opposite end; and line 78 is connected to one end of cylinder 20 with line 80 connected to its opposite end.

A detailed sectional view of cylinder 44 and its coaction with the loader support members of my invention is shown in FIGURE. 5. As indicated, said cylinder 44 is a double acting one with piston 82 slidably mounted therein. One end of piston 82 is connected to piston rod 40 also referred to herein as support finger 40. Said support finger 40 is adapted to pass through one end of cylinder 44 as it slides inwardly and outwardly therefrom in response to hydraulic fluid pressure exerted on piston 82. Fluid pressure within cylinder 44 is prevented from escaping from the end of said cylinder 44 through the use of conventional packing material 84. The travel of supporting finger 40 is determined by stop rings 86 and 88 which are positioned within said cylinder 44 in coacting relationship with piston 82 to prevent said piston 82 from moving therepast. Hydraulic fluid pressure is pumped into cylinder 44 through line 76 which is in communication with port 90 and into the opposite end of said cylinder through line 74. As previously indicated, conventional U bolts 52 are used to fixedly attach cylinder 44 to bottom supports 46, 48 and 50. End 42 of support finger 40 is preferably pointed to enable said finger 40 to be easily urged into a bale of hay when required. As shown in FIGURE 5, support finger 40 may be positioned to pass through port 92 provided in aligning strip 32 proximate its bottom end. It will be noted, however, that the bottom portion of said aligning strip may be shortened to thereby allow support finger 40 to pass therebeneath.

My baled hay loader may be used to accomplish several purposes. Firstly, the loader may be used to pick bales from the ground and load them onto a transport bed such as a hay wagon. When operating in this fashion, it is usually desirable to extend support fingers 40 to their outermost position. Loader 16 is then lowered so that support fingers 40 are positioned at the bottom of a hay bale which is to be picked up. Preferably said support fingers are angled so that they are upwardly sloping from their end 42. In this fashion, said fingers 40 easily slide under a hay bale that is supported on the ground when said fingers are urged forward by movement of tractor 10. When said bale is securely positioned on fingers 40, lift arms 12 are activated to lift the bale to any desired height. In addition, tractor 10 may be used to relocate said bale to any desired location.

In a stacking operation hay bales positioned on support fingers 40 are lifted with arms 12 to a height above the haystack upon which the bales are to be placed. The bales are then moved to a position directly above the point at which they are to be stacked. This is, of course, accomplished through movement of vehicle 10. The bales are then lowered onto the haystack and brought into intimate contact therewith by rotating fingers 40 and lowering arms 12. When said bales are in said contact fingers 40 are retracted to remove them from beneath the hay bales. During such retraction the bales supported by said fingers 40 are prevented from moving since they abut against aligning strips 24, 26, 30 and 32. When said support fingers 40 have retracted to a point behind face F—F of said aligning strips the hay bales previously supported thereon are then supported entirely by the hay bales stacked beneath them.

My hayloader may also be used to remove hay bales from baled haystacks without subjecting said stacks to tipping forces and thereby avoid the formation of wide spaces or seams between the bales. To operate in this fashion, support fingers 40 are retracted behind face F—F and said face is then positioned in contact with the hay bales which are to be removed from the stack, i.e., said face is substantially parallel with the face of the stacked bales. This may be accomplished by rotating loader 16 about pin 55 until said bales fall thereof. It is to be noted then positioned so that support fingers 42 are at an elevation proximate the horizontal innerface between stacked bales. Support fingers 40 are then extended outward whereby they move between said innerface until they are entirely supporting the hay bales stacked above said innerface. Because of the small circumferential area of support fingers 40 they slide easily said stacked bales without subjecting said stacks to undue forces. The pointed ends 42 of said fingers 40 also enable said fingers to easily slide between the stacked bales. When the bales are thus supported on support fingers 40 lift arms 12 are raised and vehicle 10 is moved backwards until the bales resting on said support fingers 40 are removed away from the aforementioned stack. Said bales can then be removed from loader 16 by either retracting support fingers 40 as previously indicated or by merely rotating said loader about pin 55 until said bales fall thereof. It is to be noted that while reference has been made to picking up a single bale, fingers 40 preferably extend outwardly away from face F—F of aligning strips 24, 26, 30 and 32 for a distance which is sufficient to support at least two bales thereon. In addition, loader 16 is preferably wide enough to support at least two bales in a direction parallel with said face F—F. Most preferably said loader 16 is provided with at least two fingers 40 for each bale which is to be supported on said loader in a single row substantially parallel with face F—F.

Whereas there is here illustrated and specifically described a certain preferred apparatus which is presently regarded as the best mode of carrying out my invention, it should be understood that various changes may be made and other construction adopted without departing from the inventive subject matter particularly pointed out and claimed.

I claim:

1. A baled haystacker to be used in combination with a traction vehicle with load elevating equipment which comprises bale aligning means, adapted to be connected to said load elevating equipment, having a bottom edge and a substantially plane front aligning face for positioning hay bales supported by said stacker; bale support means attached to said bale aligning means proximate said bottom edge for supporting hay bales wherein said bale support means is maintained in a plane which is substantially perpendicular with said front aligning face of said bale aligning means and is reciprocably mounted to move outwardly in said plane away from said aligning face and inwardly in said plane to a position behind said front aligning face; and activation means for urging said bale support means to move outwardly away from said aligning face and inwardly to a position behind said aligning face.

2. The baled haystacker of claim 1 wherein said bale support means comprises a plurality of elongated fingers having first ends adapted to support hay bales in a plane substantially perpendicular with said aligning face and second ends connected to pistons which are slidably mounted in double acting hydraulic cylinders, wherein said elongated fingers are adapted to move inwardly into said cylinders and outwardly from said cylinders when hydraulic pressure is applied to said piston.

3. The baled haystacker of claim 2 wherein the end of said first end of said elongated finger is shaped to a point.

4. The baled haystacker of claim 1 wherein connecting means are secured to said bale aligning means for pivotly connecting said bale aligning means to said load elevating equipment and for maintaining said front face of said bale aligning means in a predetermined position.

5. The baled haystacker of claim 4 wherein said connecting means includes journal means for journaling said bale aligning means to said load elevating equipment and hydraulic pistons and cylinder means secured between said bale aligning means and said load elevating equipment for maintaining said bale aligning means in said predetermined position.

6. The baled haystacker of claim I wherein said bale aligning means comprises a hatched frame with a back side and a substantially plane front face; and connecting frame means secured to said back side of said hatched frame for connecting said bale support means and said load elevating equipment to said bale aligning means.

7. The baled haystacker of claim 2 wherein connecting means are secured to said bale aligning means for pivotly connecting said bale aligning means to said load elevating equipment and for maintaining said front face of said bale aligning means in a predetermined position.

8. The baled haystacker of claim 7 wherein said connecting means includes journal means for journaling said bale aligning means to said load elevating equipment and hydraulic pistons and cylinder means secured between said bale aligning means and said load elevating equipment for maintaining said bale aligning means in said predetermined position.

9. The baled haystacker of claim 8 wherein said bale aligning means comprises a hatched frame with a back side and a substantially plane front face; and connecting frame means secured to said back side of said hatched frame for connecting said bale support means and said load elevating equipment to said bale aligning means.

10. The baled haystacker of claim 9 wherein the end of said first end of said elongated finger is shaped to a point.

References Cited
UNITED STATES PATENTS

| | | | |
|---|---|---|---|
| 2,999,608 | 9/1961 | Ganahl | 214—144 X |
| 3,257,014 | 6/1966 | Riley | 214—778 |
| 3,288,316 | 11/1966 | West | 214—145 X |

HUGO O. SCHULZ, *Primary Examiner.*

U.S. Cl. X.R.

214—146